United States Patent
Young et al.

(10) Patent No.: US 12,278,837 B2
(45) Date of Patent: *Apr. 15, 2025

(54) ANTI-PHISH NETWORK FOR SECURING ELECTRONIC COMMUNICATIONS

(71) Applicant: Bank of America Corporation, Charlotte, NC (US)

(72) Inventors: Michael Young, Davidson, NC (US); Vinesh Patel, London (GB); Melissa Gordon Glenn, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 348 days.

This patent is subject to a terminal disclaimer.

(21) Appl. No.: 17/722,722

(22) Filed: Apr. 18, 2022

(65) Prior Publication Data

US 2023/0336587 A1    Oct. 19, 2023

(51) Int. Cl.
*H04L 9/00* (2022.01)
*H04L 9/40* (2022.01)
*H04L 51/212* (2022.01)

(52) U.S. Cl.
CPC ........ *H04L 63/1483* (2013.01); *H04L 51/212* (2022.05); *H04L 63/0428* (2013.01)

(58) Field of Classification Search
CPC ............... H04L 63/1483; H04L 51/212; H04L 63/0428; H04L 51/10
See application file for complete search history.

(56) References Cited

U.S. PATENT DOCUMENTS

| | | | |
|---|---|---|---|
| 6,965,919 B1 | 11/2005 | Woods et al. | |
| 7,290,035 B2 | 10/2007 | Mattathil | |
| 7,802,298 B1 | 9/2010 | Hong et al. | |
| 7,841,003 B1 | 11/2010 | Emdee | |
| 8,291,065 B2 | 10/2012 | Goodman et al. | |
| 8,949,978 B1* | 2/2015 | Lin | H04L 63/123 |
| | | | 726/25 |
| 9,509,715 B2 | 11/2016 | Bach | |

(Continued)

OTHER PUBLICATIONS

"USAA Suspicious Emails," https://www.usaa.com/inet/wc/security_strange_email#:~:text-Cybercriminals%20may0%20try%20and%20trick.to%20every%20email%20we%20send, USAA, Retrieved on Jan. 24, 2022.

(Continued)

*Primary Examiner* — Kevin Ayala
(74) *Attorney, Agent, or Firm* — Weiss & Arons LLP

(57) ABSTRACT

Methods for securing an electronic communication is provided. In a registration process, an anti-phish, personalized, security token may be created and/or selected for a predetermined account. The token may be stored in a database at an enterprise location. An electronic communication may be generated at a third-party location on behalf of the enterprise. The communication may be forwarded from the third-party location to a recipient associated with the account. The communication may be intercepted at an edge server. The edge server may be located at the third-party location or the enterprise location. The edge server may be in communication with the database. The edge server may select, from the database, the anti-phish token that is associated with the account. The selected token may be injected into the communication. The communication with the token may be transmitted to the recipient.

12 Claims, 6 Drawing Sheets

(56) References Cited

U.S. PATENT DOCUMENTS

| | | | |
|---|---|---|---|
| 10,366,373 | B1 | 7/2019 | Denker et al. |
| 10,609,072 | B1 | 3/2020 | Weldon |
| 10,778,718 | B2 | 9/2020 | Turuvekere Nataraja |
| 10,931,709 | B2 | 2/2021 | Parekh |
| 11,055,394 | B2 | 7/2021 | Norris, III |
| 11,381,598 | B2 | 7/2022 | Nunes et al. |
| 11,438,377 | B1 | 9/2022 | Azarafrooz et al. |
| 11,546,377 | B2 | 1/2023 | Boshmaf et al. |
| 11,785,004 | B2 | 10/2023 | Soon-Shiong et al. |
| 11,882,112 | B2 | 1/2024 | Keiter et al. |
| 2007/0074119 | A1 | 3/2007 | Komine et al. |
| 2008/0034428 | A1 | 2/2008 | Bejar et al. |
| 2008/0046968 | A1 | 2/2008 | Cline et al. |
| 2009/0292025 | A1 | 11/2009 | Braude et al. |
| 2009/0292925 | A1* | 11/2009 | Meisel ............... H04L 63/0876 713/176 |
| 2010/0031022 | A1* | 2/2010 | Kramer ............... H04L 63/1483 726/3 |
| 2013/0139238 | A1 | 5/2013 | Ryan |
| 2014/0020070 | A1 | 1/2014 | Angal |
| 2014/0137192 | A1 | 5/2014 | Arroyo-Figueroa |
| 2014/0181216 | A1 | 6/2014 | Liebmann et al. |
| 2016/0078214 | A1 | 3/2016 | Angal |
| 2016/0182418 | A1* | 6/2016 | Gupta .................... H04L 63/08 709/206 |
| 2017/0230416 | A1 | 8/2017 | Sabarish |
| 2017/0329944 | A1 | 11/2017 | Satyavarapu et al. |
| 2020/0259772 | A1 | 8/2020 | Dubie et al. |
| 2020/0358798 | A1 | 11/2020 | Maylor et al. |
| 2021/0058395 | A1* | 2/2021 | Jakobsson ............. H04L 67/306 |
| 2021/0211462 | A1 | 7/2021 | Birch et al. |
| 2021/0218736 | A1 | 7/2021 | Kumar et al. |
| 2022/0070215 | A1 | 3/2022 | Stolfo et al. |
| 2022/0116420 | A1 | 4/2022 | Weber et al. |
| 2022/0318938 | A1 | 10/2022 | Ogawa |
| 2022/0385648 | A1 | 12/2022 | Keiter et al. |
| 2022/0385693 | A1 | 12/2022 | Keiter et al. |
| 2023/0086249 | A1 | 3/2023 | Albero et al. |
| 2023/0291765 | A1 | 9/2023 | Young et al. |
| 2023/0319029 | A1 | 10/2023 | Young et al. |

OTHER PUBLICATIONS

"What Is an Email Header?-Guide," https://sendpulse.com/support/glossary/email-header, SendPulse, Retrieved on Mar. 21, 2022.
"What Is an Email Header?" https://whatismyipaddress.com/email-header, CGP Holdings, Inc., Retrieved on Mar. 21, 2022.
NPL Search Terms (Year: 2024).

* cited by examiner

ANTI-PHISH PERSONALIZED SECURITY TOKENS

Anti-Phish "89898989#" — 602

Anti-Phish  — 604

Anti-Phish Animation of:  — 606

Anti-Phish rotating Pictures of:  — 608

Anti-Phish rotating Videos of:  — 610

Anti-Phish
numerical portion: 6543
audio portion:⊚ click to listen
Visual Portion: rotating uploaded photos — 612

ANTI-PHISH NETWORK FOR SECURING ELECTRONIC COMMUNICATIONS

FIELD OF TECHNOLOGY

Aspects of the disclosure relate to electronic communication security.

BACKGROUND OF THE DISCLOSURE

In recent years, the importance and the quantity of electronic communications has overtaken non-electronic communications. Electronic communications involve an assortment of information exchange. Such information exchange includes both sensitive information, such as bank account data, and non-sensitive information, such as daily international news.

Because of the profitability associated with malicious capture of sensitive information, those of malicious intent have created various techniques for deceptively obtaining sensitive information. One of the deceptive techniques may include phishing.

Phishing software is a category of malware in which an imitation electronic communication is sent to a recipient. A malicious entity may impersonate a legitimate entity, organization or individual. The malicious entity may generate an electronic communication. The electronic communication may appear to have been transmitted by the impersonated entity, organization or individual. The electronic communication may include an information request, a funds request, a download request or any other malicious actionable.

Many times, phishing communications are transmitted as mass campaigns. For example, a malicious entity may harvest a plurality of emails addresses from a plurality of sources, including websites. The malicious entity may transmit a mass, non-targeted, email campaign that impersonates a financial institution. The email may include a request to click on a link to recertify a know your customer ("KYC") criteria. Once selected, the link may direct a user to a malicious webpage that replicates the look and feel of a financial institution. The malicious webpage may capture sensitive information relating to the unsuspecting user.

Because of the proliferation of malicious phishing communications, many users are hesitant to enter information into and/or select links that are found within even legitimate electronic communications. Therefore, many legitimate electronic communications do not receive responses because the receivers are suspicious that the legitimate communications are phishing communications.

Previously, in order to overcome the above-stated problem, a secure communication tunnel was created. The secure communications tunnel is a direct communication between a legitimate entity and a client. The secure communications tunnel secures the direct communications between the legitimate entity and the client. However, there exists a problem with secure communication tunnels. At times, legitimate entities utilize third-parties to transmit electronic communications. As such, a legitimate third-party may transmit an electronic communication on behalf of the legitimate entity. Because the secure communications tunnel is a direct link between the legitimate entity and the client, and the third-party may not be able to communicate with the client using the secure communications tunnel, the third-party may not be able to transmit secure communications to the client on behalf of the entity. Therefore, a secure communications tunnel fails to solve the problem of increasing a recipient's confidence of the security of an electronic communication transmitted from a legitimate third-party on behalf of a legitimate entity.

Therefore, it would be desirable for electronic communications originating from legitimate entities to be self-authenticating. As such, an anti-phish, personalized, security token may be injected into each electronic communication originating from a legitimate entity, or a third-party operating on behalf of the legitimate entity. The anti-phish, personalized, security token may increase the confidence of the receiving entity regarding the validity of the electronic communication.

SUMMARY OF THE DISCLOSURE

Apparatus, methods and systems for securing electronic communications is provided. The system may include an enterprise server. The enterprise server may be located at an enterprise location. The enterprise server may be linked to and/or include a hardware processor and/or a memory. The enterprise server may transmit electronic communications to a plurality of recipients. The enterprise server may store one or more electronic addresses for each recipient included in the plurality of recipients. The enterprise server may store the one or more electronic addresses within the memory.

The system may also include an edge server. The edge server may be located at the enterprise location. In certain embodiments, the edge server may be located at the third-party location.

The system may also include an anti-phish, personalized, security token database. The anti-phish, personalized, security token database may be located at the enterprise location. The anti-phish, personalized, security token database may store an anti-phish, personalized, security token for each recipient included in the plurality of recipients.

An anti-phish, personalized, security token may be a numeric code, a photograph, a plurality of photographs, an animation, a plurality of animations, an audio recording and/or any suitable combination of the above-stated options. The anti-phish, personalized, security token may be associated with a theme. The anti-phish, personalized, security token may enable a user to upload one or more photographs and/or one or more animations.

The anti-phish, personalized, security token may include a dynamically-rotating digital artwork file linked to a non-fungible token ("NFT"). The dynamically-rotating file may rotate on a predetermined schedule and/or randomly.

The system may also include a third-party server. The third-party server may be located at the third-party location. The third-party location may be a different location than the enterprise location. The third-party server may be in communication with the enterprise server. The third-party server may transmit electronic communications to the plurality of recipients on behalf of the enterprise server.

The enterprise server may generate a first electronic communication. The first electronic communication may be for transmission to the plurality of recipients. The enterprise server may transmit the one or more electronic addresses to the third-party server.

The enterprise server may transmit the first electronic communication to the third-party server. In certain embodiments, the enterprise server may instruct the third-party server to generate the first electronic communication. In such embodiments, the third-party server may generate the first electronic communication.

The third-party server may generate a copy of the first electronic communication for each of the one or more electronic addresses.

The third-party server may forward each copy of the first electronic communication to edge server. The edge server may retrieve, for each of the electronic addresses, the anti-phish, personalized, security token from the anti-phish, personalized, security token database. The edge server may inject each retrieved anti-phish, personalized, security token into each copy of the first electronic communication.

The edge server may forward each copy of the first electronic communication, including the injected anti-phish token, to the third-party server. The third-party server may forward each copy of the first electronic communication, including the injected anti-phish token, to a corresponding recipient included in the plurality of recipients. The recipient may be identified based on the stored one or more electronic addresses.

During a registration process, a user may enter an electronic address into a web-based interface associated with the enterprise server. The user may create and/or select an anti-phish, personalized security token at the web-based interface. The created and/or selected anti-phish, personalized, security token is stored in the anti-phish, personalized, security token database. The anti-phish token may be identified by the electronic address entered into the web-based portal. As such, the electronic address may be stored at the enterprise server and/or at the anti-phish token database.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
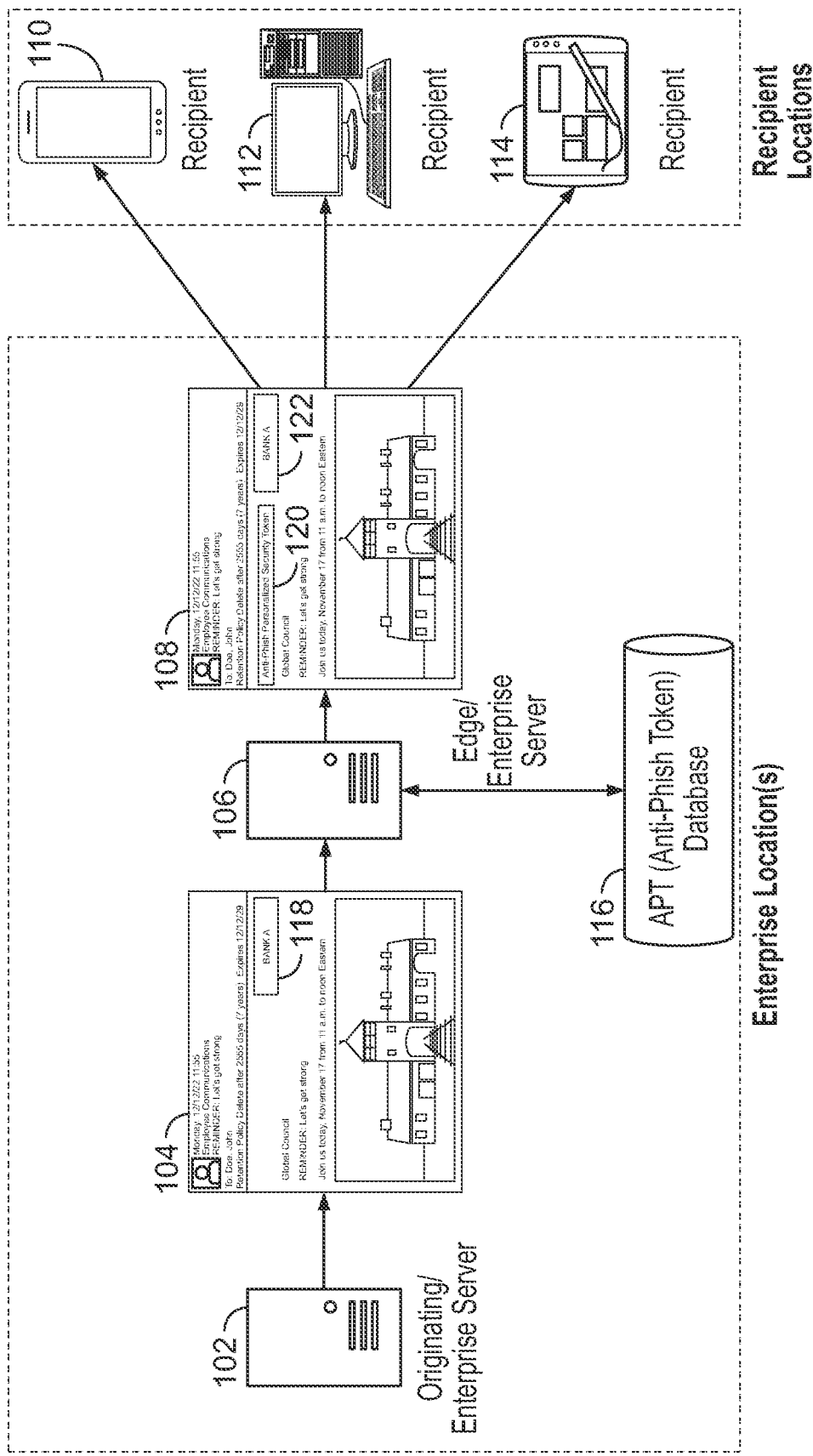
FIG. 1 shows an illustrative flow diagram in accordance with principles of the disclosure.

Apparatus, methods and systems for securing electronic communications is provided. A system may include an originating server. The originating server may be located at an entity location. The entity location may be associated with an entity. The system may include an edge server. The edge server may be located at an entity location.

The system may include a third-party server. The third-party server may be located at a third-party location. The system may include a database. The database may be located at the entity location.

During a registration process, the originating server may receive a request from a user. The request may be to receive an anti-phish, personalized, security token with electronic communication from the entity.

During the registration process, the originating server may display a plurality of selectable options for the anti-phish, personalized, security token. The originating server may receive a selection of an option for the anti-phish, personalized, security token. The option may be included in the plurality of selectable options.

The plurality of selectable options may include a numeric code, a photograph, a plurality of photographs, an animation, a plurality of animations and/or a combination of the numeric code, photograph, plurality of photographs, animation and plurality of animations. The plurality of selectable options may be associated with a theme.

The plurality of selectable options may include a dynamically-rotating, digital-artwork file linked to an NFT. The file and/or the NFT may rotate on a predetermined schedule or randomly. The plurality of selectable options may enable the user to upload one or more photographs.

The originating server may register the selected option as being linked to a profile associated with the user. The originating server may store, in the database, the anti-phish, personalized, security token linked to the profile associated with the user.

During an in-use process, the third-party server may generate an electronic communication on behalf of the entity. A recipient of the electronic communication may be the user. The third-party server may forward the electronic communication to the edge server. The edge server may retrieve, from the database, the anti-phish, personalized, security token linked to the profile associated with the user. The edge server may populate the electronic communication with the anti-phish, personalized, security token.

The edge server may forward the electronic communication to the third-party server. The third-party server may forward the electronic communication to one or more channels associated with the recipient. In certain embodiments, the edge server may forward the electronic communication directly to one or more electronic channels associated with the recipient.

The plurality of channels may include email communications, short messaging service ("SMS") communications, instant messaging service ("IMS") communications, metaverse communications and any other suitable communications.

Methods for securing electronic communications is provided. Methods include receiving one or more electronic address for each recipient included in a plurality of recipients. Methods may include storing the one or more electronic addresses at the enterprise server.

Methods may include receiving, at an anti-phish, personalized, security token database, an anti-phish token for each of the one or more recipients included in the plurality of recipients. Methods may include storing, at the anti-phish, personalized, security token database, the anti-phish, personalized, security token for each of the one or more recipients included in the plurality of recipients.

Methods may include generating a first electronic communication at a third-party server. The third-party server may be located at a third-party location. The enterprise location and the third-party location may be different locations.

A recipient of the first electronic communication may be included in the plurality of recipients. Methods may also include copying, at the third-party server, the first electronic communication for each of the plurality of recipients. Methods may include forwarding each copy of the first electronic communication to an edge server located at the third-party location.

Methods may include retrieving the anti-phish, personalized, security token that corresponds to the recipient of the copy of the first electronic communication. The retrieval may be executed by the edge server. The edge server may retrieve an anti-phish token for each copy of the first electronic communication.

Methods may include injecting the anti-phish, personalized, security token into each copy of the first electronic communication. The injecting may be executed by the edge server. The edge server may inject an anti-phish token into each copy of the first electronic communication.

Methods may include forwarding each copy of the first electronic communication to the corresponding recipient from the plurality of recipients. The edge server may execute the forwarding.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative flow diagram. The illustrative diagram shows an electronic communication created at an enterprise location. The electronic communication is injected with an anti-phish token at the enterprise location. The electronic communication is forwarded from an edge server at the enterprise location to one or more recipients. The one or more recipients may be located at recipient locations.

Originating/enterprise server 102 may generate and/or create electronic communication 104. Electronic communication 104 may be an informative communication generated for multiple recipients. Electronic communication 104 may be a communication generated for a single recipient. Electronic communication 104 may include logo 118. Logo 118 may indicate the name of the enterprise transmitting electronic communication 104. In electronic communication 104, the name of the enterprise identified by logo 118 may be Bank A.

Originating/enterprise server 102 may forward electronic communication 104 to edge/enterprise server 106. Edge/enterprise server 106 may prepare a copy of electronic communication 108 for each recipient. Edge/enterprise server 106 may retrieve an anti-phish, personalized security token for each recipient. Edge/enterprise server 106 may retrieve the anti-phish tokens from anti-phish token database 116.

Upon retrieving an anti-phish token for each recipient, edge/enterprise server 106 may inject each retrieved anti-phish token into the appropriate copy of the electronic communication. Electronic communication 108 includes a placeholder for an anti-phish token, shown at 120. Electronic communication 108 also includes logo 122. Logo 122 indicates that electronic communication 108 was created and/or generated by Bank A.

Each copy of electronic communication 108 may be transmitted to appropriate recipients located at recipient locations. The recipients include recipient 110, recipient 112 and recipient 114.

Figure 2:
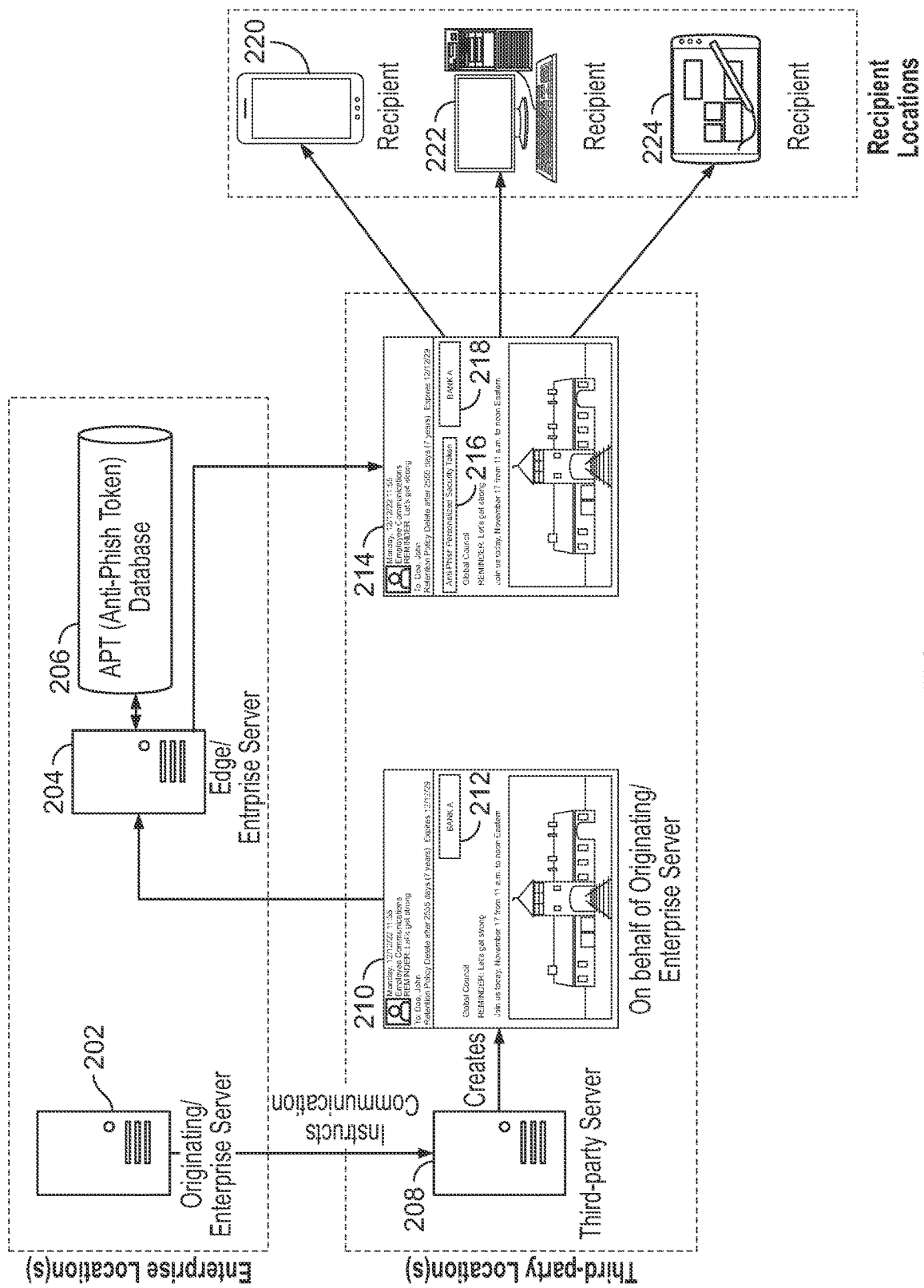
FIG. 2 shows another illustrative flow diagram in accordance with principles of the disclosure.

FIG. 2 shows an illustrative flow diagram. At times, an enterprise may instruct a third-party to create an electronic communication on behalf of the enterprise. However, the third-party may not have access to an anti-phish token database. In order to inject the anti-phish token into the electronic communication, the electronic communication may be transmitted to a server within the enterprise location. The server within the enterprise location may have access to the anti-phish token database. The server within the enterprise location may retrieve an anti-phish token for each of the recipients. The server within the enterprise location may inject the retrieved anti-phish token into the appropriate electronic communication. The server within the enterprise location may forward the electronic communications with the injected anti-phish tokens back to the third-party location. The third-party may forward the electronic communications to the recipients.

Originating/enterprise server 202 may be located at an enterprise location. Third-party server 208 may be located at a third-party location. Originating/enterprise server 202 may instruct third-party server 208 to create electronic communication 210 on behalf of originating/enterprise server 202. Because third-party server is creating electronic communication 210 on behalf of originating/enterprise server 210, third-party server may include logo 212 within electronic communication 210. Logo 212 may be a logo associated originating/enterprise server 202. Logo 212 may indicate the originating entity associated with electronic communication 210.

In such an embodiment, which may preserve the privacy of the anti-phish token database, the anti-phish token database may not be accessible by the third-party. As such, once a copy of electronic communication 210 has been generated for each recipient, each copy of electronic communication 210 may be transmitted to edge/enterprise server 204. Edge/enterprise server 204 may be located at an enterprise location. Edge/enterprise server 204 may communicate with anti-phish token database 206.

Edge/enterprise server 204 may retrieve an appropriate anti-phish token for each copy of electronic communication 210 from anti-phish token database 206. It should be appreciated that a unique anti-phish token may be retrieved for each recipient. Once the unique anti-phish token has been retrieved, edge/enterprise server 204 may inject the appropriate anti-phish token into each copy of electronic communication 210. The copies of electronic communication 210 with the injected anti-phish tokens may be transmitted to the third-party location. Electronic communication 214 may be shown at the third-party location. Electronic communication 214 may include anti-phish token 216. Electronic communication 214 may also include logo 218. Logo 218 may indicate that Bank A is the originator of electronic communication 214.

The third party may forward each copy of electronic communication 214 with the appropriate anti-phish token to recipient 220, recipient 222 and recipient 224.

Figure 3:
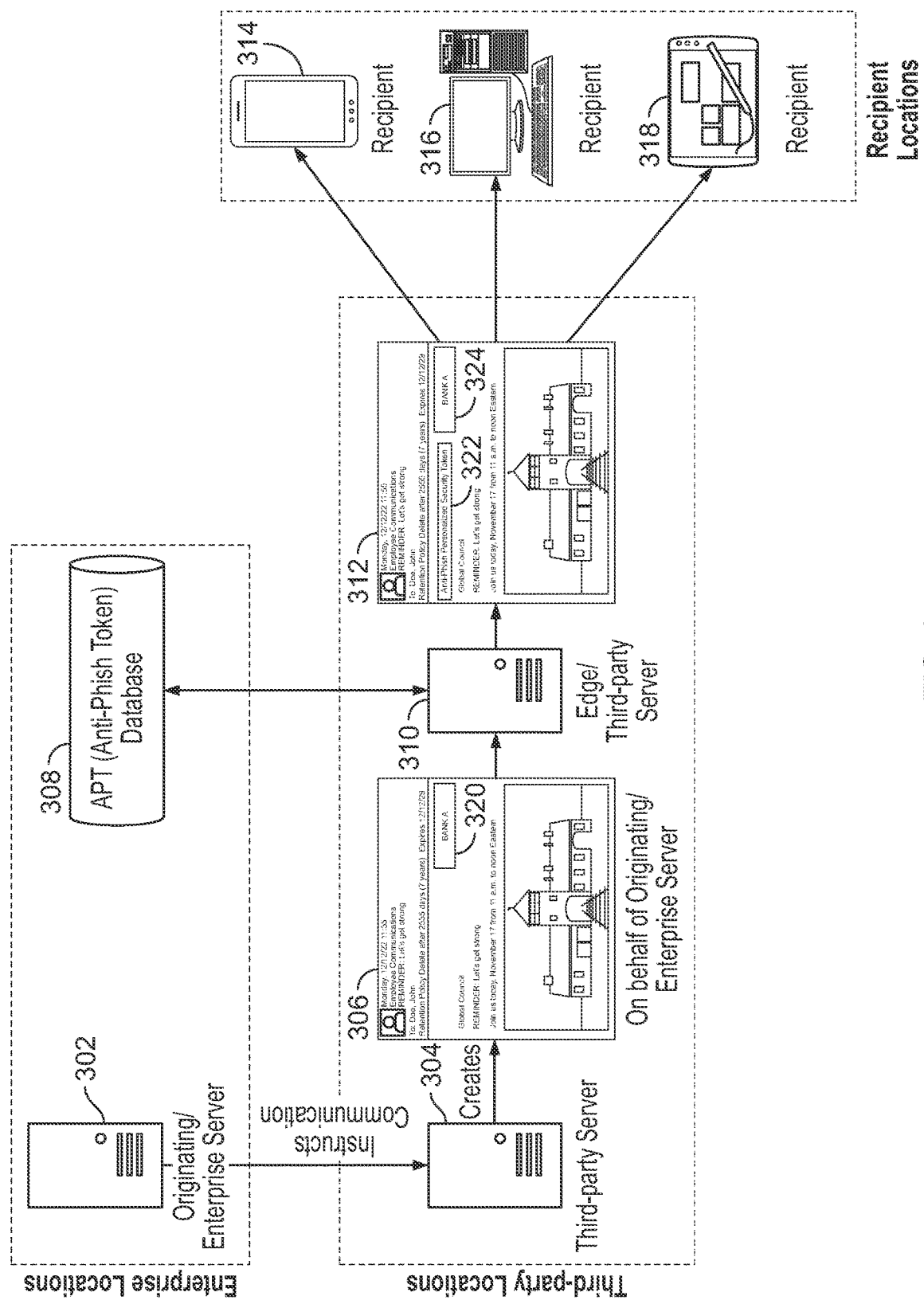
FIG. 3 shows yet another illustrative flow diagram in accordance with principles of the disclosure.

FIG. 3 shows an illustrative flow diagram. At times, an enterprise may instruct a third-party to create an electronic communication on behalf of the enterprise. However, the third-party may not have access to an anti-phish token database. In order to inject the anti-phish token into the electronic communication, an edge-server located at the third-party may be linked to the anti-phish token database at the enterprise location. The link between the edge server at the third-party location and the anti-phish token database may enable the edge server at the third-party location to retrieve anti-phish tokens for electronic communications being transmitted from the third-party on behalf of the enterprise.

Originating/enterprise server 302, located at an enterprise location, may instruct third-party server 304 to create electronic communication 306 on behalf of the originating/enterprise server 302. Electronic communication 306 may include logo 320. Logo 320 may indicate that electronic communication 306 was transmitted from, or on behalf of, originating/enterprise server 302.

After electronic communication 306 has been created, electronic communication 306 is forwarded to edge/third-party server 310. In some embodiments, edge/third-party server 310 may intercept communications transmitted from third-party server 304. As such, third-party server 304 may be unaware of edge/third-party server 310.

Edge/third-party server 310 may communicate with anti-phish token database 308. The communication may include transmitting recipient data from edge/third-party server 310 to anti-phish token database 308 and receiving an anti-phish token associated with the recipient data. The recipient data may include an email address, telephone number or any other suitable data.

Edge/third-party server 310 may inject the received anti-phish token into the electronic communication, as shown at electronic communication 312. Anti-phish, personalized, security token is shown at 322. Logo 324 indicates the transmitting enterprise associated with electronic communication 312. Electronic communication 312 may be transmitted to recipient 314, recipient 316 and recipient 318.

Figure 4:
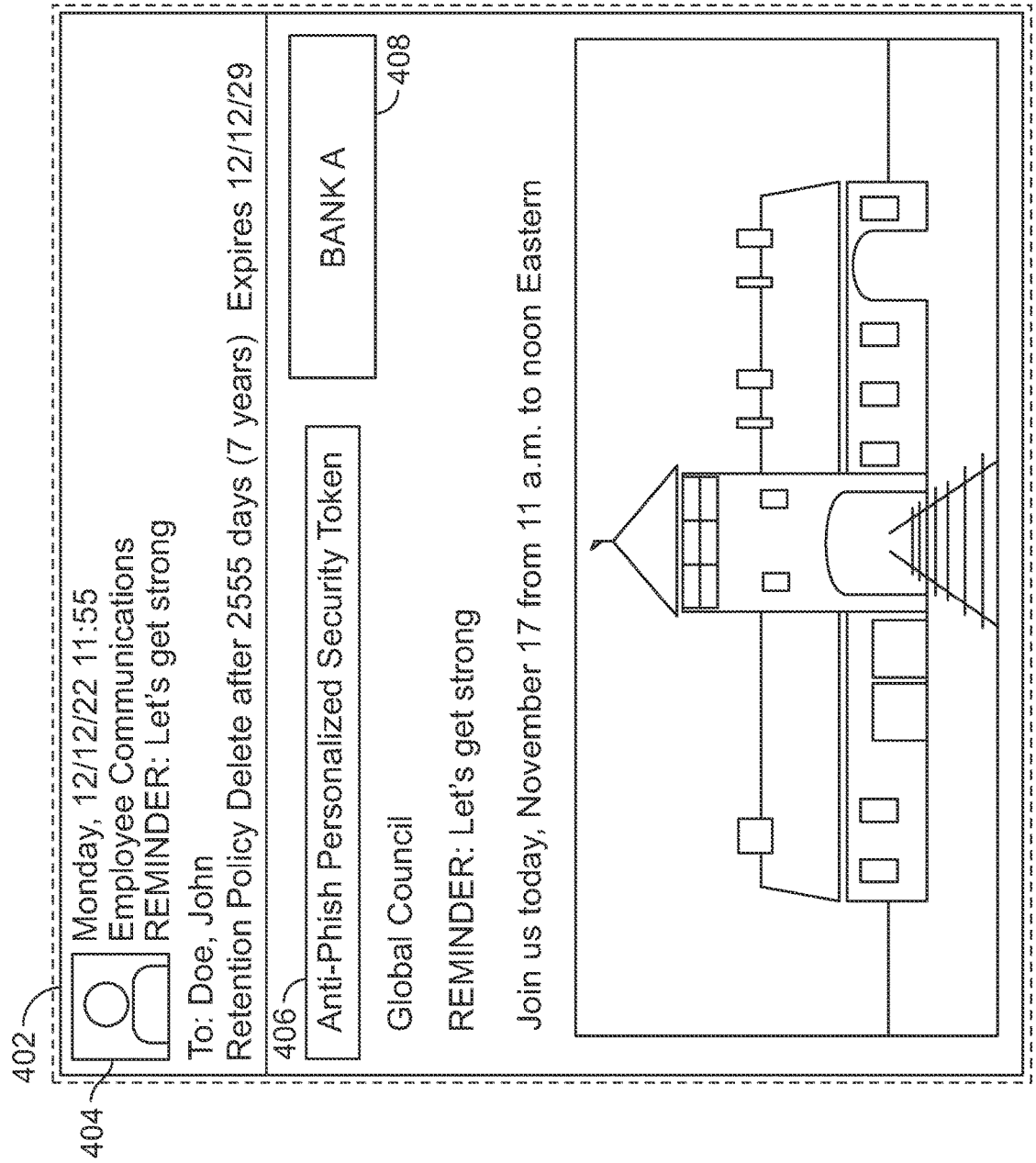
FIG. 4 shows an illustrative diagram in accordance with principles of the disclosure.

FIG. 4 shows an illustrative diagram. The illustrative diagram shows electronic communication 402. Electronic communication 402 may be an email. The details of electronic communication 402 may be shown at 404. The details may include the date (Monday, 12/12/22 11:55), the entity and/or address from which electronic communication 402 was transmitted (Employee Communications), the subject (Reminder: Let's get strong), the recipient list (John Doe), the retention policy (Delete after 2555 days (7 Years)) and the expiration date (12/12/29).

The body of the electronic communication 402 may include text, drawings and any other suitable details. The body of electronic communication 402 may also include logo 408. Logo 408 may indicate the entity that transmitted electronic communication 402. Logo 408 may indicate the affinity of electronic communication 402. Electronic communication 402 may be transmitted from an employee communications address associated with Bank A.

Recipient John Doe may receive electronic communication 402. John Doe may identify the sender of the email as Employee Communications at Bank A. In order to achieve a level of confidence that the communication is indeed from Employee Communications at Bank A, John Doe may look for an anti-phish, personalized, security token embedded in electronic communication 402.

Anti-phish, personalized, security token may be shown at 406. Anti-phish, personalized, security token may be a dynamic and/or static, encrypted and/or non-encrypted, personalized electronic component that acts as a quick visual aid and indicates a level of confidence that the communication is indeed from an enterprise. The electronic component may be selected by the recipient of the communication, such as John Doe.

The electronic component may include one or more of the following, a numeric code, a photograph, an animation, a plurality of photographs, a plurality of animations any other suitable data element. The electronic component may dynamically select a photograph that relates to a pre-selected theme. As such, a communication recipient may select a theme, such as famous skyscrapers, and the token may retrieve a photograph or animation of a famous skyscraper from a plurality of photographs or from a network search, such as an Internet search. As such, the anti-phish, personalized, security token may appear different each time an electronic communication is transmitted from the transmitting entity to the recipient. For example, the anti-phish, personalized, security token may include a different photograph each time an electronic communication is transmitted from the transmitting entity to the recipient.

Even though a single electronic communication may be transmitted to multiple recipients, such as in a mass email campaign, the anti-phish, personalized, security token may be individual for each recipient. As such, after the electronic communication has been generated and transmitted, an intercepting server may inject the personalized token into each individual electronic communication.

Figure 5:
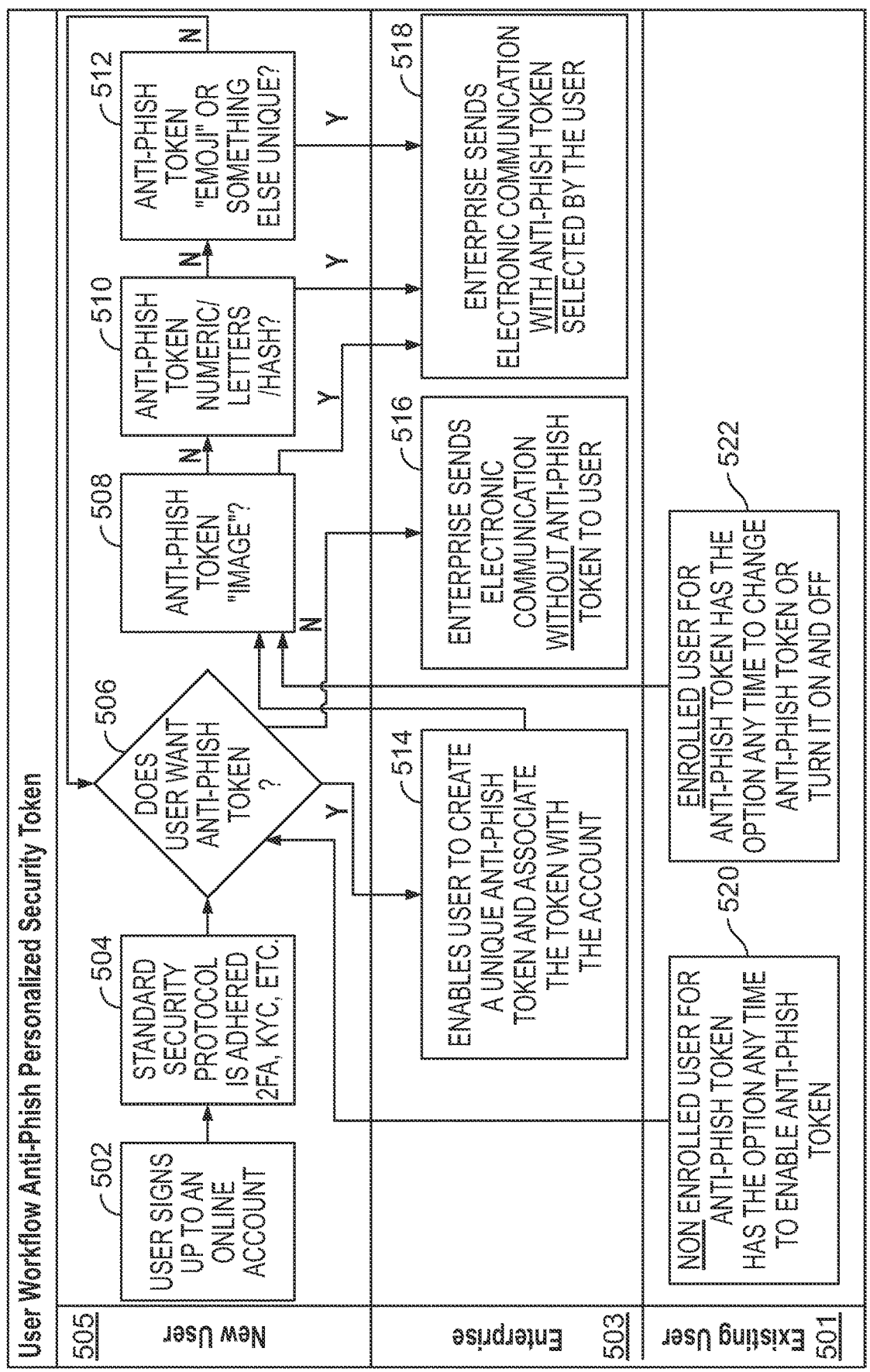
FIG. 5 shows an illustrative flow chart in accordance with principles of the disclosure.

FIG. 5 shows an illustrative flow chart. The flow chart relates to a user workflow for an anti-phish, personalized, security token. The user workflow may show a process in which a user registers for an anti-phish security protocol. The anti-phish security protocol may include receiving an anti-phish security token with each communication received from an enterprise.

There may be three swim lanes (or any other suitable number of swim lanes), a new user swim lane 505, an enterprise swim lane 503 and an existing user swim lane 501.

A new user may sign up for an online account, as shown at 502. The online account may be opened using a computing apparatus, such as mobile device or personal computer ("PC"). The computing apparatus may communicate with an enterprise server. The communication between the new user and the enterprise server may include the new user opening, and communicating with, an enterprise website. The online account may be any suitable account associated with an enterprise. Such an enterprise may be indicated by swim lane 503.

Standard security protocols may be adhered to when opening the account, as shown at 504. Such security protocols may include two-factor authentication ("2FA") and KYC protocols.

The enterprise server may query the user whether the user wants an anti-phish token, as shown at 506. It should be noted that an existing user that is not enrolled for an anti-phish token may have the option to enable an anti-phish token at any time, as shown at 520.

In the event that a user does want an anti-phish token, enterprise 503 may enable the user to create a unique anti-phish token and associate the unique anti-phish token with the account, as shown at 514. The user may select an anti-phish token image, as shown at 508, an anti-phish token numeric, letters and/or hash, as shown at 510, and an anti-phish token emoji or any other unique item, as shown at 512. Enterprise 503 may also enable a user to invoke an anti-phish generation algorithm. Such an anti-phish generation algorithm may generate a numeric code and/or photograph that may be specific to the user. The numeric code and/or photograph may be based on historical internet searches and/or other suitable information.

Once the anti-phish token is selected, the enterprise may send electronic communications to the user with the anti-phish token selected by the user, as shown at 518.

In the event that the user does not want an anti-phish token associated with the account, the enterprise may send electronic communications to the user without the anti-phish token, as shown at 516. Additionally, a user that is enrolled in the anti-phish token security protocol may have the option to change the anti-phish token or turn it on or off at any time, as shown at 522.

Figure 6:
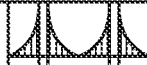
FIG. 6 shows an illustrative flow diagram in accordance with principles of the disclosure.
Figure 6:
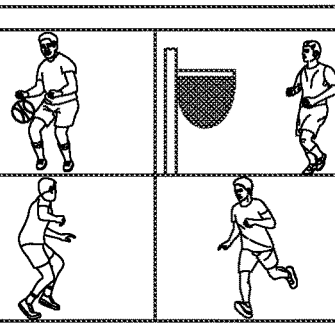
Figure 6:
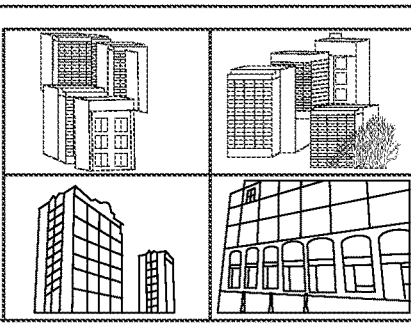
Figure 6:
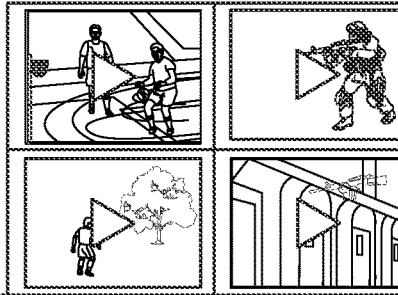

FIG. 6 shows another illustrative diagram. The illustrative diagram shows exemplary variations of an anti-phish, personalized, security token. It should be appreciated that a user may select any suitable combination of characters, digits, pictures, animations, audio clips and any suitable rotating characters, digits, pictures, animations, audio clips.

An anti-phish token may be a group of characters, as shown at 602. An anti-phish token may be a picture, as shown at 604. An anti-phish token may be animation of a selected sports players, as shown at 606.

An anti-phish token may be rotating pictures of cities in a specific geographical location, as shown at 608. An anti-phish token may be rotating videos of sports events related to a specific sports team, as shown at 610. An anti-phish token may be a combination of a numerical portion, an audio clip and rotating uploaded photos, as shown at 612.

Thus, an anti-phish, personalized, security token for use with electronic communications is provided. Persons skilled in the art will appreciate that the present invention can be practiced by other than the described embodiments, which are presented for purposes of illustration rather than of limitation. The present invention is limited only by the claims that follow.

What is claimed is:

1. A system for securing electronic communications, the system comprising:
an originating server comprising a hardware processor and memory, said originating server located at an entity location associated with an entity;
an edge server located at the entity location;
a third-party server located at a third-party location;
a database located at the entity location;
wherein during a registration process:
the originating server receives a request from a user, the request to receive an anti-phish, personalized, security token with each electronic communication from the entity;
the originating server displays a plurality of selectable options for the anti-phish, personalized, security token, the plurality of selectable options comprising a dynamically-rotating, digital-artwork file linked to a non-fungible token ("NFT"), said digital-artwork file that rotates on a predetermined schedule;
the originating server receives a selection of an option for the anti-phish, personalized, security token, the option included in the plurality of selectable options;
the originating server registers the selected option as being linked to a profile associated with the user; and
the originating server stores, in the database, the anti-phish, personalized, security token linked to the profile associated with the user;
wherein during an in-use process:
the third-party server generates an electronic communication on behalf of the entity, where a recipient of the electronic communication is the user;
the third-party server forwards the electronic communication to the edge server;
the edge server retrieves, from the database, the anti-phish, personalized, security token linked to the profile associated with the user; and
the edge server populates the electronic communication with the anti-phish, personalized, security token.

2. The system of claim 1, wherein during the in-use process:
the edge server forwards the electronic communication to the third-party server; and
the third-party server forwards the electronic communication to one or more channels associated with the recipient.

3. The system of claim 1, wherein during the in-use process, the edge server forwards the electronic communication to one or more electronic channels associated with the recipient.

4. The system of claim 1, wherein the plurality of selectable options further comprises a numeric code, a photograph, a plurality of photographs, an animation, a plurality of animations and/or a combination of the numeric code, photograph, plurality of photographs, animation and plurality of animations.

5. The system of claim 4, wherein the plurality of selectable options is associated with a theme.

6. The system of claim 4, wherein the plurality of selectable options enables the user to upload one or more photographs.

7. A system for securing electronic communications, the system comprising:
an originating server comprising a hardware processor and memory, said originating server located at an entity location associated with an entity;
an edge server located at the entity location;
a third-party server located at a third-party location;
a database located at the entity location;
wherein during a registration process:
the originating server receives a request from a user, the request to receive an anti-phish, personalized, security token with each electronic communication from the entity;
the originating server displays a plurality of selectable options for the anti-phish, personalized, security token, the plurality of selectable options comprising a dynamically-rotating digital artwork linked to a non-fungible token ("NFT") that rotates randomly;
the originating server receives a selection of an option for the anti-phish, personalized, security token, the option included in the plurality of selectable options;
the originating server registers the selected option as being linked to a profile associated with the user; and
the originating server stores, in the database, the anti-phish, personalized, security token linked to the profile associated with the user;
wherein during an in-use process:

the third-party server generates an electronic communication on behalf of the entity, where a recipient of the electronic communication is the user;

the third-party server forwards the electronic communication to the edge server;

the edge server retrieves, from the database, the anti-phish, personalized, security token linked to the profile associated with the user; and the edge server populates the electronic communication with the anti-phish, personalized, security token.

8. The system of claim 7, wherein during the in-use process:

the edge server forwards the electronic communication to the third-party server; and the third-party server forwards the electronic communication to one or more channels associated with the recipient.

9. The system of claim 7, wherein during the in-use process, the edge server forwards the electronic communication to one or more electronic channels associated with the recipient.

10. The system of claim 7, wherein the plurality of selectable options further comprises a numeric code, a photograph, a plurality of photographs, an animation, a plurality of animations and/or a combination of the numeric code, photograph, plurality of photographs, animation and plurality of animations.

11. The system of claim 7, wherein the plurality of selectable options is associated with a theme.

12. The system of claim 7, wherein the plurality of selectable options enables the user to upload one or more photographs.

* * * * *